(12) United States Patent
Bontempo et al.

(10) Patent No.: US 11,470,442 B2
(45) Date of Patent: Oct. 11, 2022

(54) ELECTRONIC COMMUNICATION SYSTEM

(71) Applicant: Daniel Bontempo, Fairview, PA (US)

(72) Inventors: Daniel Bontempo, Fairview, PA (US); William Gulian, Eagleville, PA (US); Dhruv Sringari, Lansdale, PA (US); Kyle Cook, Eagleville, PA (US); Peter Luba, Eagleville, PA (US); Ananth Dandibhotla, Collegeville, PA (US)

(73) Assignee: Daniel C. Bontempo, Fairview, PA (US)

( * ) Notice: Subject to any disclaimer, the term of this patent is extended or adjusted under 35 U.S.C. 154(b) by 0 days.

(21) Appl. No.: 17/288,009

(22) PCT Filed: Sep. 4, 2019

(86) PCT No.: PCT/US2019/049527
§ 371 (c)(1),
(2) Date: Apr. 23, 2021

(87) PCT Pub. No.: WO2020/051212
PCT Pub. Date: Mar. 12, 2020

(65) Prior Publication Data
US 2021/0400424 A1 Dec. 23, 2021

Related U.S. Application Data

(60) Provisional application No. 62/726,574, filed on Sep. 4, 2018.

(51) Int. Cl.
*H04W 4/021* (2018.01)
*G07C 9/29* (2020.01)
(Continued)

(52) U.S. Cl.
CPC ........ *H04W 4/021* (2013.01); *G07C 9/00571* (2013.01); *G07C 9/29* (2020.01); *G08B 25/006* (2013.01); *G08B 25/10* (2013.01)

(58) Field of Classification Search
CPC ....... H04W 4/021; H04W 4/029; H04W 4/33; H04W 4/90; G07C 9/00571; G07C 9/29;
(Continued)

(56) References Cited

U.S. PATENT DOCUMENTS 10,158,974 B1 * 12/2018 Merjanian ............... H04W 4/06
10,176,692 B1 * 1/2019 Vesterman ........... G06Q 10/101
(Continued)

OTHER PUBLICATIONS

International Search Report and Written Opinion for PCT/US2019/049527, dated Nov. 6, 2019. 8 pages.
(Continued)

*Primary Examiner* — An T Nguyen
(74) *Attorney, Agent, or Firm* — Joseph E. Maenner; Maenner & Associates, LLC

(57) ABSTRACT

A method includes the steps of electronically generating a pass for a user within a facility; electronically tracking the location of the user within the facility; electronically generating a notification of an event; electronically receiving a message from the user whether the user is inside or outside of the facility; and electronically generating a list of people inside the facility.

17 Claims, 7 Drawing Sheets

(51) Int. Cl.
*G07C 9/00* (2020.01)
*G08B 25/00* (2006.01)
*G08B 25/10* (2006.01)

(58) Field of Classification Search
CPC ........ G07C 9/00; G08B 25/006; G08B 25/10; G08B 27/006; H04L 12/1845; H04L 51/20
See application file for complete search history.

(56) References Cited

U.S. PATENT DOCUMENTS

| | | | | |
|---|---|---|---|---|
| 11,024,105 | B1* | 6/2021 | Brand | G07C 9/10 |
| 2007/0273474 | A1* | 11/2007 | Levine | G05B 15/02 |
| | | | | 340/5.28 |
| 2013/0048720 | A1* | 2/2013 | Lewis | G07C 9/253 |
| | | | | 235/382 |
| 2014/0266590 | A1* | 9/2014 | Guillaud | G07C 9/29 |
| | | | | 340/8.1 |
| 2015/0365246 | A1* | 12/2015 | Kane | H04W 4/021 |
| | | | | 709/203 |
| 2017/0105108 | A1* | 4/2017 | South | G08B 25/016 |
| 2019/0274611 | A1* | 9/2019 | Chavez, Jr. | G06Q 50/205 |
| 2019/0274612 | A1* | 9/2019 | Chavez, Jr. | G09B 5/14 |
| 2019/0274613 | A1* | 9/2019 | Chavez, Jr. | A61B 5/168 |
| 2020/0005413 | A1* | 1/2020 | Wilkinson | G06Q 50/205 |
| 2020/0066129 | A1* | 2/2020 | Galvez | H04W 4/029 |
| 2021/0400424 | A1* | 12/2021 | Bontempo | H04W 4/021 |

OTHER PUBLICATIONS

International Preliminary Report on Patentability for PCT/US2019/049527, dated Mar. 9, 2021. 5 pages.

\* cited by examiner

FIG. 17

ELECTRONIC COMMUNICATION SYSTEM

BACKGROUND OF THE INVENTION

Field of the Invention

The present invention relates to a system for use in a school or similar environment that enables participants to know where a person is or is going to at any given time.

Description of the Related Art

With the unfortunate rise in school shootings, it is imperative that teachers and administrators are aware of the location of their students and other personnel throughout the school day. It would be beneficial to provide a system and method that allows teachers and administrators to track the locations of students, particularly students who, for one reason or another, are not physically in a classroom at the time that an emergency event arises.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a method comprising the steps of electronically generating a pass for a user within a facility; electronically tracking the location of the user within the facility; electronically generating a notification of an event; electronically receiving a message from the user whether the user is inside or outside of the facility; and electronically generating a list of people inside the facility.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 17 is an exemplary GUI of a list of people on site at the time of an emergency.

DETAILED DESCRIPTION

Figure 3:
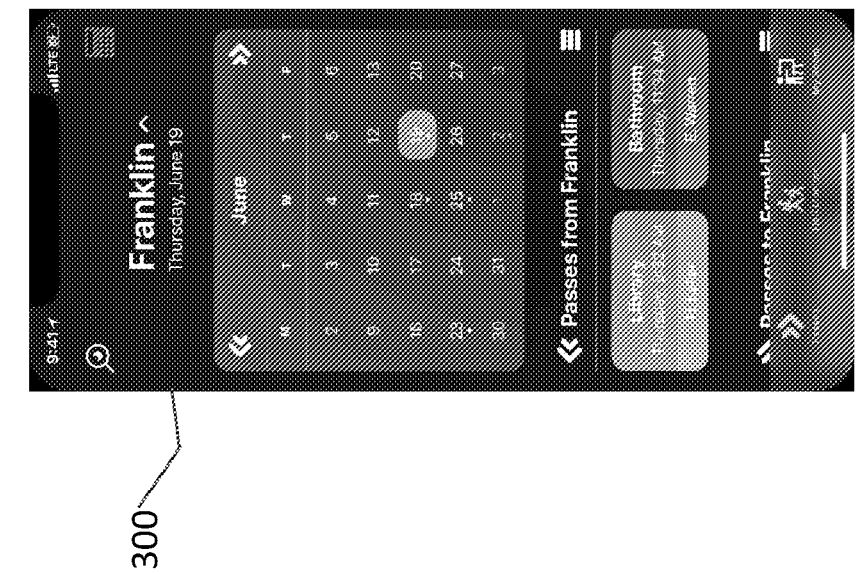
FIG. 3 is an exemplary GUI showing a calendar for generating a pass that can be used in the future.
Figure 2:
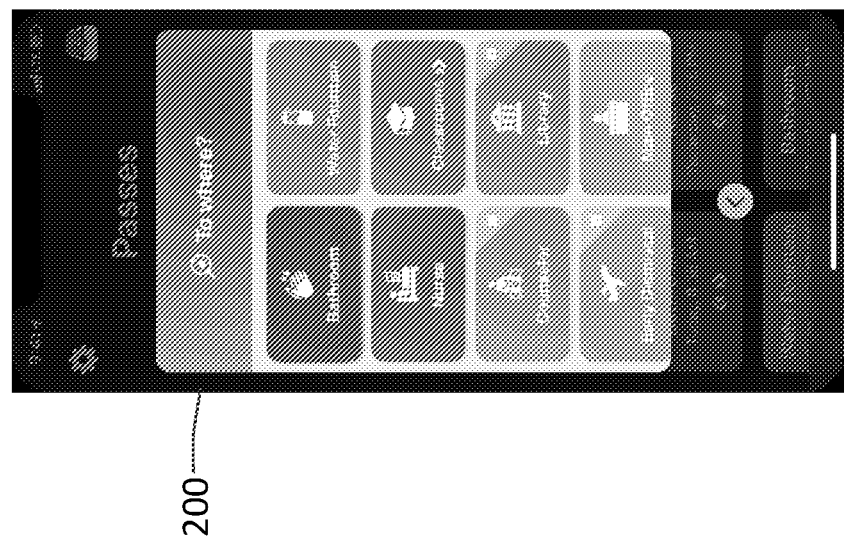
FIG. 2 is an exemplary GUI showing locations where the pass of FIG. 1 can be used.

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the term "location" is defined as a generally defined area, such as a building or suite of proximally located buildings, a campus, or other fixed geographic area. A "position" is defined as the place where a person utilizing the inventive system may physically be. While the "location", once defined, is static, a "position" can be moveable, depending on the movements of each person within or around the location.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention is a system that is used to provide electronic communication and electronic personnel accounting at an institutional location or facility such as a school, a hospital, a large place of employment, or other location that has a relatively large number of people associated with it. The system can provide an electronic pass system (a "hall pass") to monitor users and their position within a large location. The system also uses aspects of the pass system to allow for reporting an emergency or a potential emergency, as well as to account for the position of personnel throughout a location during an actual emergency, such as, for example, a school shooting. The process through which the user interacts with the multitude of functions is through the use of interfacing GUI elements, GUI navigation, and form input.

An exemplary embodiment of the electronic pass system is shown in FIGS. 1-6. The pass system can be utilized from an electronic device to access a website or computer application ("app") run from a cloud-based data service. Exemplary electronic devices can be cell phones, electronic pads, laptops, desktop computers, or other similar type of electronic device. The electronic devices are registered with the system so that notifications can be sent from teachers and administrators to students carrying or otherwise using the electronic devices.

Students are able to use the electronic pass system to perform the following functions: create passes for the present; schedule future passes; transmit pass requests to teachers for the present; transmit pass requests to teachers for a future time; receive passes from teachers for the present; receive passes from teachers for a future time; accept/decline pass requests from teachers; view their expired passes; and receive push notifications on various pass functions. Those skilled in the art will recognize that other features can be added.

Teachers are able to use the electronic pass system to perform the following functions: create hall passes for students for the present; schedule future passes for students; transmit hall pass requests to students for future use; approve/deny pass requests from students; view expired passes that they created or accepted; view currently active hall passes in the entire location; search students to determine whether a student has an active pass; report students for not having active passes; view active passes that have the teacher's room as the origin or destination; view expired and scheduled hall passes that have the teacher's room as the origin; view expired and scheduled passes that have the teacher's room as the destination; and receive push notifications on various pass functions. Those skilled in the art will recognize that other features can be added.

Administrators are able to use the electronic pass system to perform the following functions: view statistics on pass usage throughout the location, including average pass time, most frequent locations, most frequent users, etc.; view currently active passes in the entire location; search students to determine whether a student has an active pass; view teacher reports from reported students; search by student and filter by date, teacher room and generate a report from this information; search by date and filter by student, teacher room and generate a report from this information; search by teacher room and filter by date, student and generate a report from this information; view and create student profiles; manage restrictions and settings for student profiles; view and create teacher profiles; manage restrictions and settings for teacher profiles; view and create administrator profiles; manage restrictions and settings for administrator profiles; view and create substitute profiles; manage restrictions and settings for substitute profiles; configure the passes for the school, including settings for pass name, whether the pass is in a folder, room number, teachers who are in the room, pass color, pass icon, travel type (one-way or round-trip), pass restriction for the present, pass restriction for the future, and pass time limit; and manage settings for the location, including default pass time, enable/disable future passes, and enable/disable student declinable passes. Those skilled in the art will recognize that other features can be added.

Figure 1:
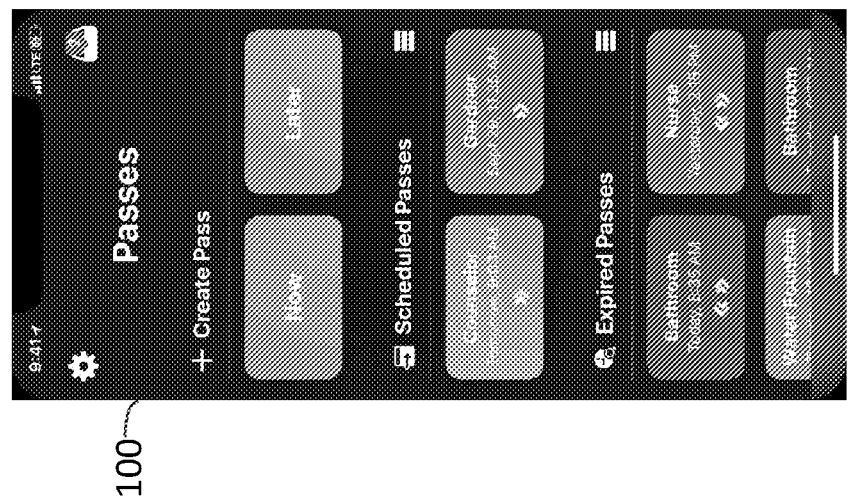
FIG. 1 is an exemplary Graphical User Interface ("GUI") showing the creation of a pass for use with the system of the present invention.

Referring to FIG. 1, GUI 100 shows an exemplary screen where a student can input the necessary information such as location of origin, destination and duration of the pass. Additionally, the pass can be made for the present time ("Now") or for some date in the future ("Later"). It is up to school administrative discretion whether the student needs to get formal approval (the teacher accepting a pass request), verbal approval (the teacher telling them they can go after creating a pass), or the student just leaving the classroom with the pass. The different locations where a student can go are shown in GUI 200 in FIG. 2. The teacher can view the student inputted information, deem the information acceptable or unacceptable, and then select a GUI element that generates the pass from the request or deny the pass. Passes can be round trip such as a restroom visit, or they may be one way for destinations of unknown duration such as the nurses' office. For a future pass, a calendar, shown in GUI 300 in FIG. 3, allows the student to select the date of the pass.

Figure 4:
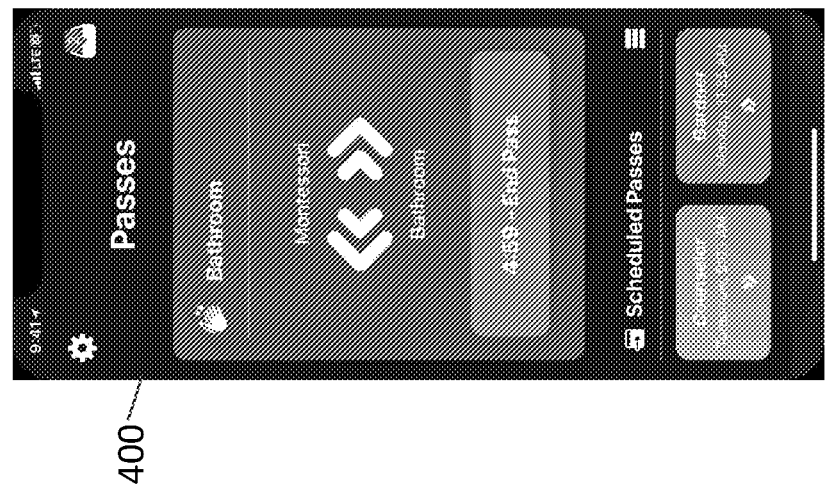
FIG. 4 is an exemplary GUI showing the time remaining in a pass.
Figure 9:
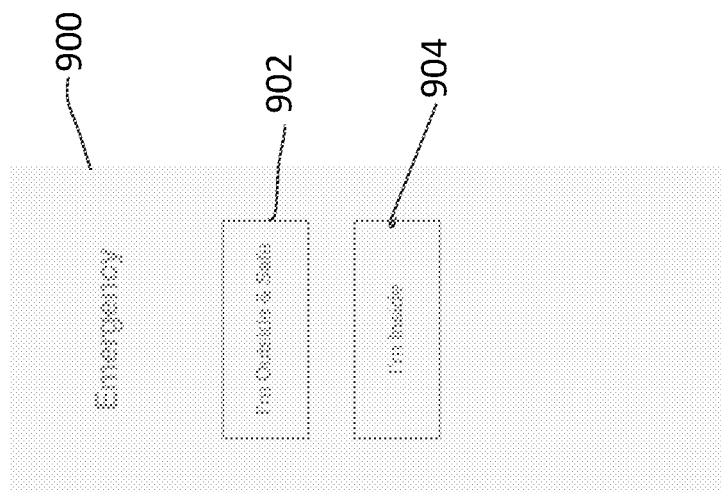
FIG. 9 is an exemplary GUI showing buttons that can be pressed to indicate a user's status in an emergency event.

Referring to GUI 400 In FIG. 4, student devices display a countdown timer displaying the amount of time left on that pass. The timer becomes red and counts up as the student exceeds the time allotted as the duration of the pass. Students may schedule themselves for detention or lunch detention by writing themselves a pass to those events at the time of the infraction. Students may, likewise, schedule themselves for attendance at other events such as presentations by visiting college representatives or specialty assemblies where prior registration is required.

Figure 5:
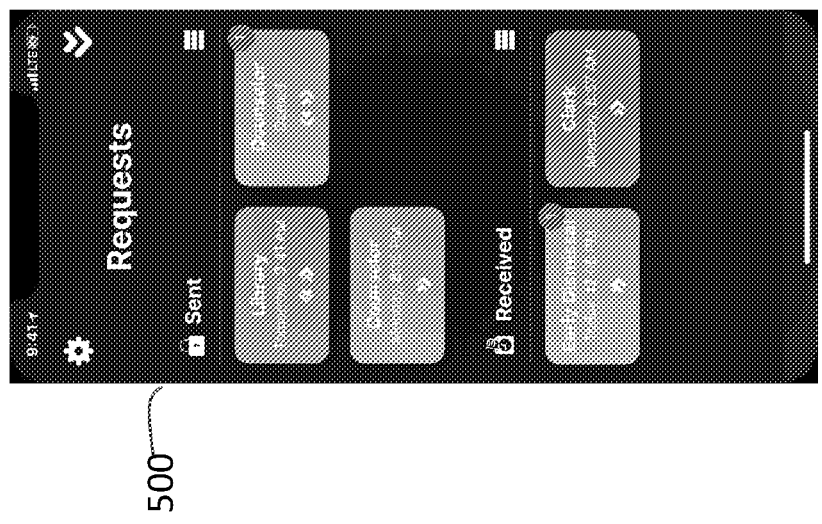
FIG. 5 is an exemplary GUI showing requests for passes that a user has made or received.

Referring to GUI 500 in FIG. 5, students may request a pass through the system such as an appointment with a teacher to make up a missed assessment or an appointment to see the school counselor. That staff member then issues approval electronically for the given appointment, which is listed in the student's folder as a future pass. The pass can be generated through a web socket or another live data services. The pass shows up in a GUI element that displays the aforementioned data that corresponds to the pass request. Future passes can be marked to receive a timed audible reminder prior to the appointment time. Students have the ability to accept or decline passes issued by staff as future passes.

Figure 6:
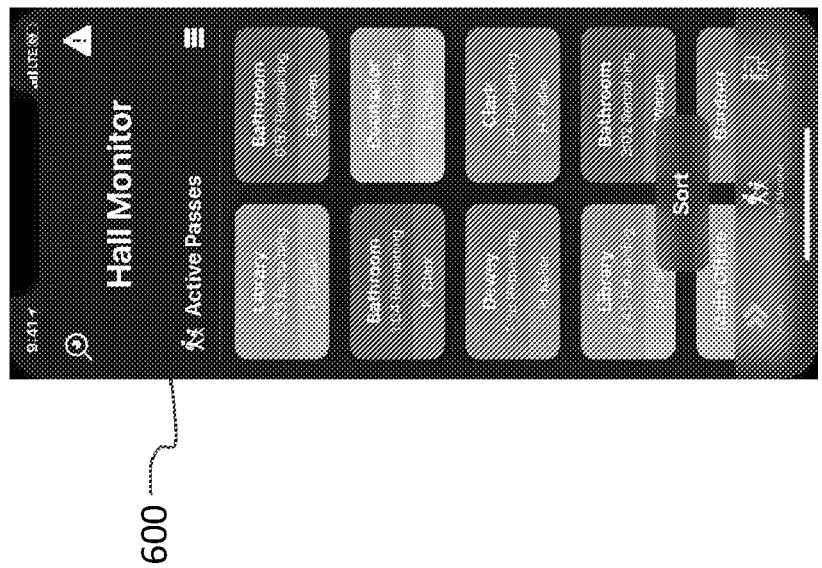
FIG. 6 is an exemplary GUI showing active passes associated with a particular staff member.

Throughout the school day, staff can see the pass activity that is occurring in their classroom(s). GUI 600, shown in FIG. 6, shows how the staff can see currently active hall passes, passes that are created from their room, and passes that are created to their room. At any time during the school day school day, staff are able to sign-in to see all students who signed out of their rooms and all students who were scheduled to report to their rooms. Passes shows up in a GUI element that displays the aforementioned data that corresponds to the pass requests. This enables staff to approve and monitor student movement throughout the building without interrupting the lesson to provide the student with a pass.

Staff may send pass requests to students for future passes by generating a pass and inputting a student's name as well as the date and location for which the pass is to be used. Optionally, multiple student names can be input to generate multiple passes for the same time to the same location (e.g., for all team members to go to a team meeting during school hours). They may approve or deny student requested future passes and propose an alternate date/time through the system.

Staff monitoring the halls and students travelling through the halls can search electronically to see if a student is listed as having a currently active pass. The staff can view all currently valid passes. The system allows staff to electronically report students to the teacher of origin and administration if the students are found to have an expired pass or do not have a pass at all. The report GUI allows for the selection of a student, multiple students, or have it prepopulated by opening the GUI through an expired pass. The staff also has the option to input a message to inform administration of any important information regarding a student or a pass.

Administrators have the ability to run a variety of reports showing who is present in various locations at any time. An administrator can input the desired restrictions/parameters that correspond to the fields on passes/reports. Exemplary parameters can include type, "to" location, "from" location, start/end/expiry time, duration, etc. The report is generated using the selected restrictions/parameters. Other analytics can be generated on a per student/teacher/date range basis that interfaces with the aforementioned parameters. These analytics can include averages of duration, peak hours, most visited locations, etc. Reports on the number of passes and time out-of-class can be generated objectively for students with excessive usage. Various student, teacher, and substitute teacher profiles and reports can be accessed through GUI embedded in the system.

Figure 7:
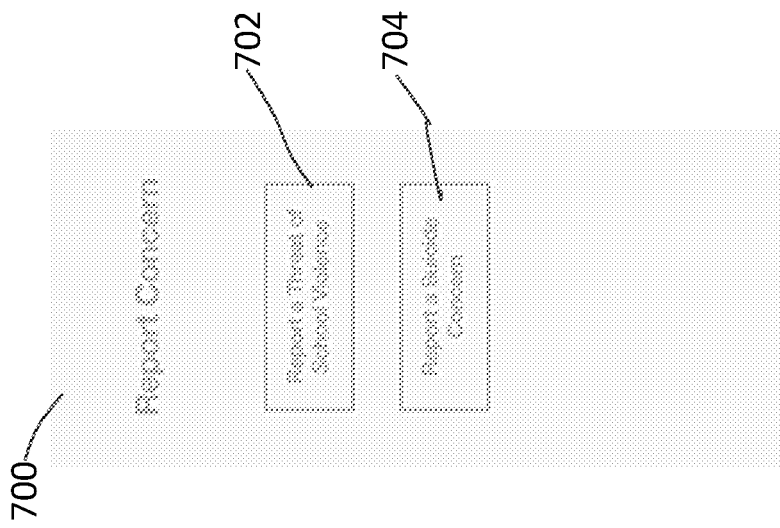
FIG. 7 is an exemplary GUI showing buttons that can be pressed to report a concern to a system administrator.
Figure 10:
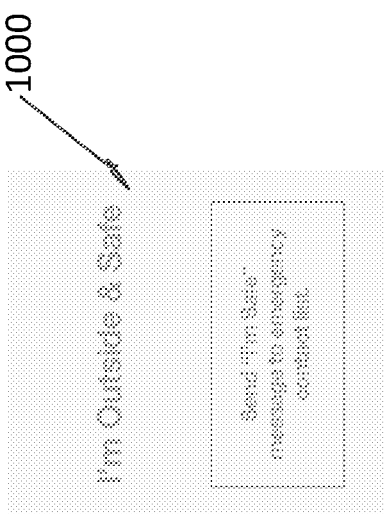
FIG. 10 is an exemplary GUI showing a button that can be pressed to indicate to an emergency contact list that the user is safe.

The potentially life-threatening emergency report function, shown in GUI 700 in FIG. 7, gives students the ability to quickly inform school officials of an emergency event that they have become aware of. Two report buttons, 702, 704 are provided on GUI 700 and viewed every time students utilize the hall pass system. They are, "Report a Threat of School Violence" (702) and "Report a Suicide Concern" (704). This feature has the potential to save students' lives. In almost every school tragedy, someone had heard in advance that there was a possibility of it taking place. Students did not report that information. This feature will be a constant reminder of the need to report and provide the readily accessible mechanism for doing so.

When the students click on button 702 or 704, they are taken to an investigative report form within the app to provide information to school officials. After the form is filled out, the student clicks a "Send" button and the report is emailed and text messaged to school administrators, threat assessment teams, and other appropriate emergency personnel.

Figure 8:
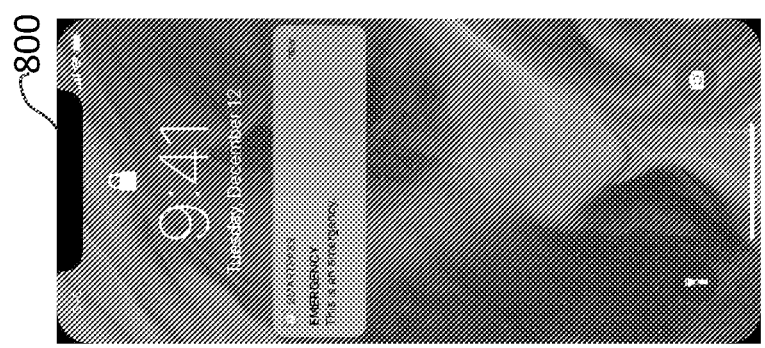
FIG. 8 is an exemplary GUI showing an indication of an emergency associated with a building.

Referring to FIGS. 8-14, the emergency event student accounting system is activated during a true emergency or emergency drill. During such an event, administrators have the ability to notify teachers of event circumstances through all of their registered devices as part of a layered emergency communication plan. FIG. 8 shows GUI 800 informing a user of an emergency. This could be crucial if the public address system is made inoperable or administrators want to operate in stealth to not let the perpetrator know information.

Students are able to use the system in an emergency to send messages to school officials regarding threats of school violence or suicide concerns; receive emergency alert notifications; receive messages from administrators and emergency personnel; have two-way direct communication with administrators and emergency personnel; self check-in to communicate with administrators and emergency personnel where a student is located and their safe/not safe status once outside; and send a message to all family contacts list indicating their location and their safe/not-safe status with one button activation after confirming they are safely outside the building and that location is confirmed (double checked) via geofencing technology.

Teachers are able to use the system to receive emergency alert notifications; receive messages from administrators and emergency personnel; have two-way direct communication with administrators and emergency personnel; and have student check-in to communicate with administrators and emergency personnel where a student travelling on a hall pass is located.

Figure 15:
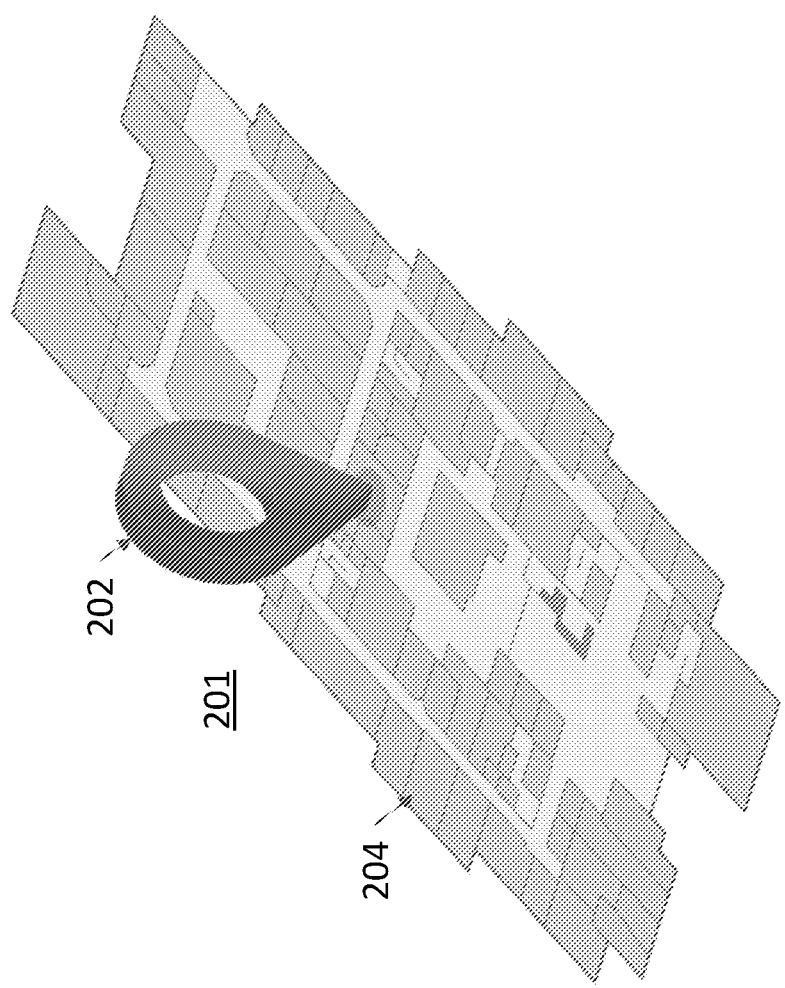
FIG. 15 is an exemplary GUI of a map of the building and the location of a person within the building.

Administrators are able to use the system to press an alert button to notify emergency services without calling; send messages and communicate with all students and/or teachers; send messages and communicate with select teachers and/or students depending on location; direct communication to students and two-way communication with teachers; view a list of students with active passes at the time of the emergency alert notification; view which students have checked-in their location, which have marked themselves as safe, and which students have not yet responded; view active GPS location tracking of students and teachers; and access a live building map of the school which shows where remaining students and staff are located using location tracking. FIG. 15 shows an exemplary GUI of a map 201 that indicates the location of a person 202 still inside the building 204.

Emergency Personnel are able to use the system to receive emergency alert from administrators; have administrative rights and views of the system for routine monitoring; see messages and communicate with all students and/or teachers; view a list of students with active passes at the time of the emergency alert notification; view which students have checked-in their location, which have marked themselves as safe, and which students have not yet responded; and access a live building map of the school which shows where remaining students and staff are located using location tracking.

In a true emergency, the emergency site commander can restrict parent access to geolocation of students until the students are marked safely out of the building, while emergency personnel maintain that notification and information for students remaining in the building; and the site commander has the ability to isolate communications from inside the building from student/staff communications from outside the building utilizing geofencing technology. Communications from outside the building can be channeled to a lower priority communication system at the site commander's discretion.

Parents and Other Emergency Contacts are able to use the system to receive emergency alert notifications; receive safe status notification from students; receive automatic series of messages from students indicating their position as they travel away from the emergency site; and receive a message from students when they have entered the geofenced family reunification site. Parents only can have mobile electronic devices that can be scanned for a unique identifier to their child at the reunification site for efficient and reliable reunification and have family reunification notification to administration and emergency personnel. Parents may elect to geofence their home and receive notification that the student is within the residential property.

The student view of the system transforms during an emergency event. The system no longer functions as a pass app; it is now an emergency communication app that gives students and staff the ability to report to administrators (by pressing button 902) and emergency responders whether they have evacuated the building safely or if they are still inside (by pressing button 904), as shown in GUI 900 in FIG. 9. Once the students and staff have done that, another button as shown in GUI 1000 in FIG. 10 appears that will allow the user to press to simultaneously notify all persons on their emergency contact list that they have evacuated the building and are safe. This is accomplished through Wi-Fi or cellular data service as opposed to SMS text messaging that may be overwhelmed due to the emergency.

Figure 11:
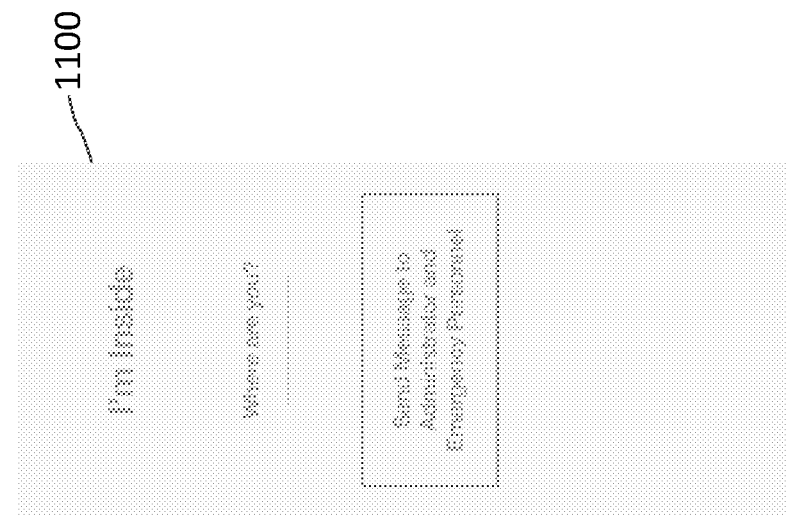
FIG. 11 is an exemplary GUI showing a button that can be pressed to indicate to an administrator and to emergency personnel that the user is still inside the building.

If the user presses the button 904 on GUI 900 that states that they are still in the building, GUI 1100, shown in FIG. 11, appears and allows the user to provide their position and to send a message to the Administrator and to emergency personnel who will have authorized logins that have permissions that will allow the emergency personnel to see an emergency responder view of the app or allow them to access a standalone (but accompanying) app that displays the relevant information about the situation at hand.

Figure 12:
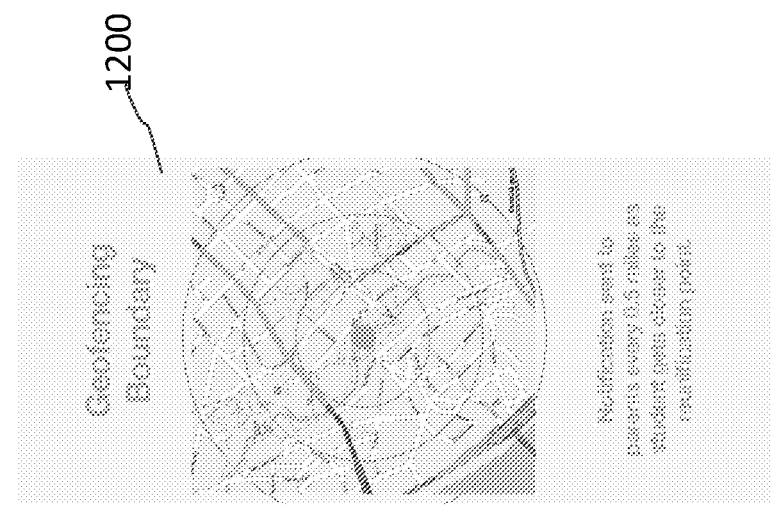
FIG. 12 is an exemplary GUI showing a geofencing boundary around the building to indicate a user position as the user approaches a predetermined reunification point.
Figures 13, 14:
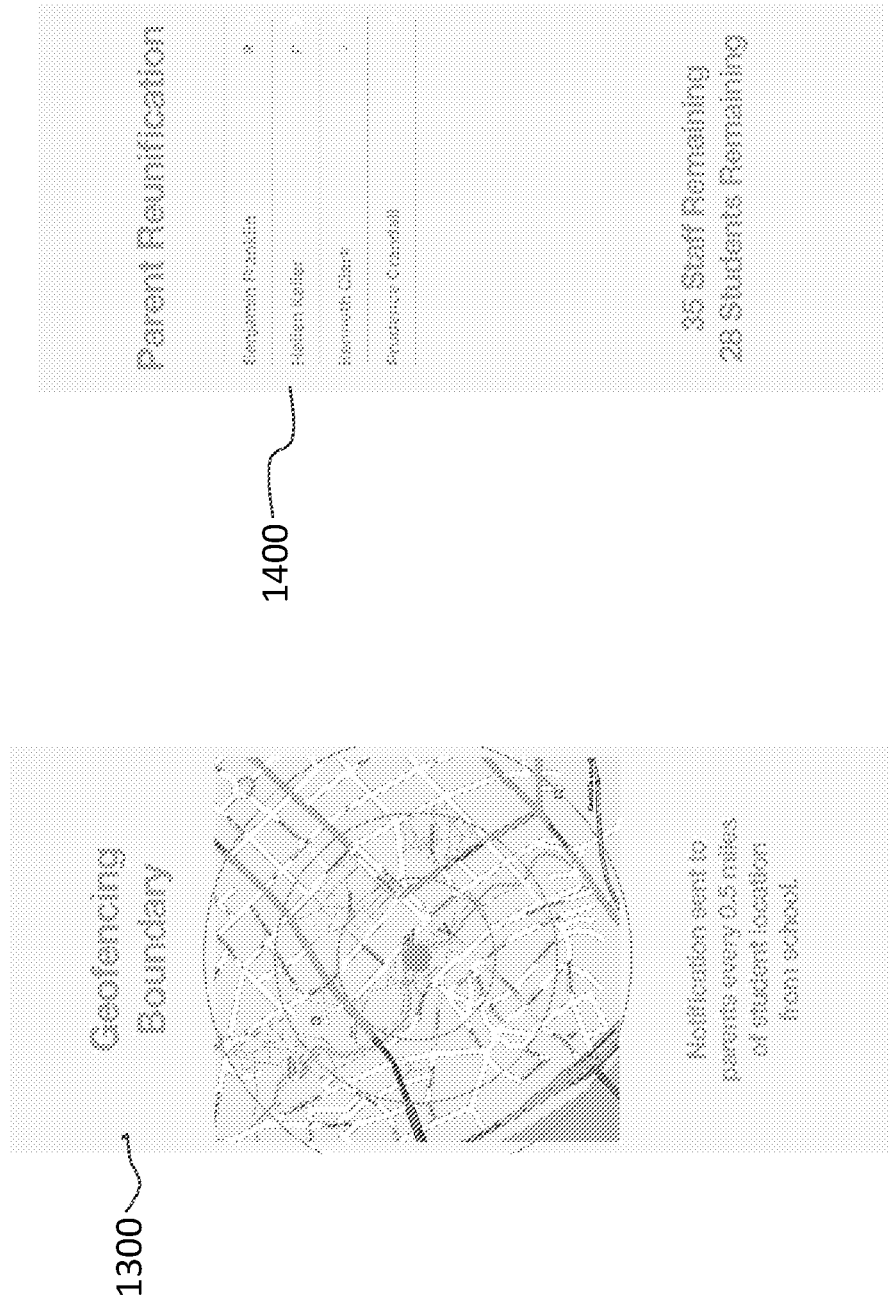
FIG. 13 is an exemplary GUI showing the geofencing boundary around the building to indicate to emergency contacts as the user gets a predetermined distance away from the location.
FIG. 14 is an exemplary GUI showing parent reunification information and a numerical tally of students and staff who have not yet been united with emergency contacts.

As students then travel away from the emergency site, the administration and emergency contacts are automatically notified as they pass each geofenced ½ mile mark, as shown in GUI 1200 in FIG. 12. While ½ mile increments are shown, other distances (e.g., 1 km) can be used instead. Family members can visualize their child's departure from the site through these location messages, shown in GUI 1300 in FIG. 13, which will keep frantic family members from rushing to the scene to see if their loved one is safe. The geofencing technology can double check the position of the student being outside the prior to their family notification contact button being activated.

Figure 16:
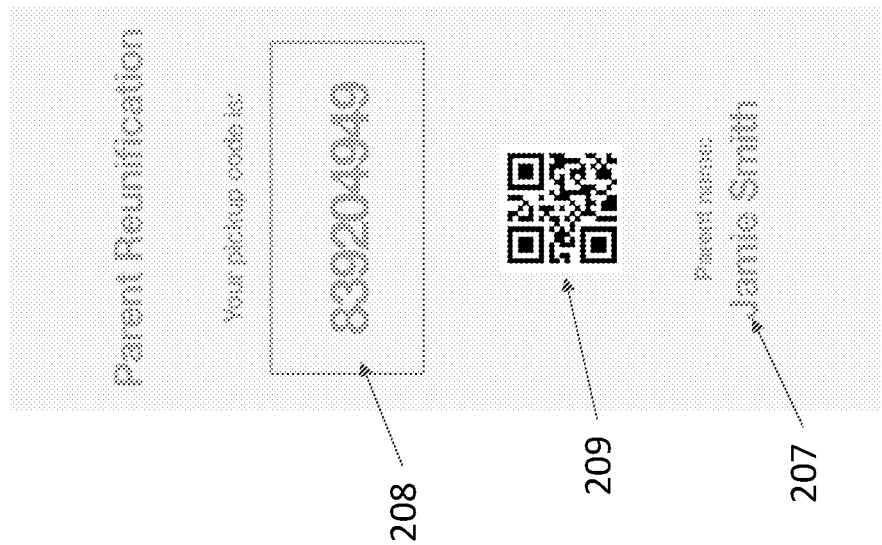
FIG. 16 is an exemplary GUI of a parent reunification pick-up code.

At the family reunification site, parents' mobile devices will be scanned for a unique identifier for their child in order to effect efficient and reliable reunification. Assigned school staff will scan a uniquely provided code off of the parent's phone when the parent arrives at the location. The parent's name 207 with an exemplary code 208 is shown in FIG. 16. The unique code will show up in the app, the parent with the code, and the child with the scanner. By way of example, the identifier can be in the form of a barcode, QR code (209), an alphanumeric code, or any other suitable electronically readable format. By way of example, the "scanner" can be a traditional scanner done through an electronic device's camera, or, in the case of alphanumeric identifier 208, an entry field into which the student types the code and submits to the system. The code would be displayed on a parent device as previously stated, but the data stored in the code would be on an external server. As shown in GUI 1400 in FIG. 14, school administrators and first responders will have a GUI to confirm successful reunification of parents with their child or children.

In connection with the pass system, administrators and emergency personnel will be able to pull up and view a list of students that had active passes when the system was put into emergency mode (See FIG. 6). To ensure that no students are inadvertently missed, the passes will be exempt from expiring so that the names of the students remain on the list until the student is either accounted for or the emergency is over. Because these students were in the hallway and not protected by being inside a classroom, these students are marked as a priority. Administrators can quickly see if these students have marked themselves or have been marked by a teacher as being taken into another classroom or marked as outside and safe.

The emergency event student and staff accounting system provides emergency responders with real-time data on number of students and staff evacuated safely and number of students and staff remaining. Employees report their attendance at work through the app on a daily basis to maintain an accurate building census. Substitute teachers, temporary employees, and visitors are logged in as they present to the building. Substitute teachers log in the same way as the rest of the teachers and staff at the school, but with a guest teacher account. Guests will be logged in by an administrator, such as at the front office. A running list cataloging the name of the visitor, contact information, and time in/out is provided in the system. The system includes live building maps and the position of hiding students through geolocation technology. Live two-way communication can be held among remaining students, emergency personnel and administration.

Figure 17:
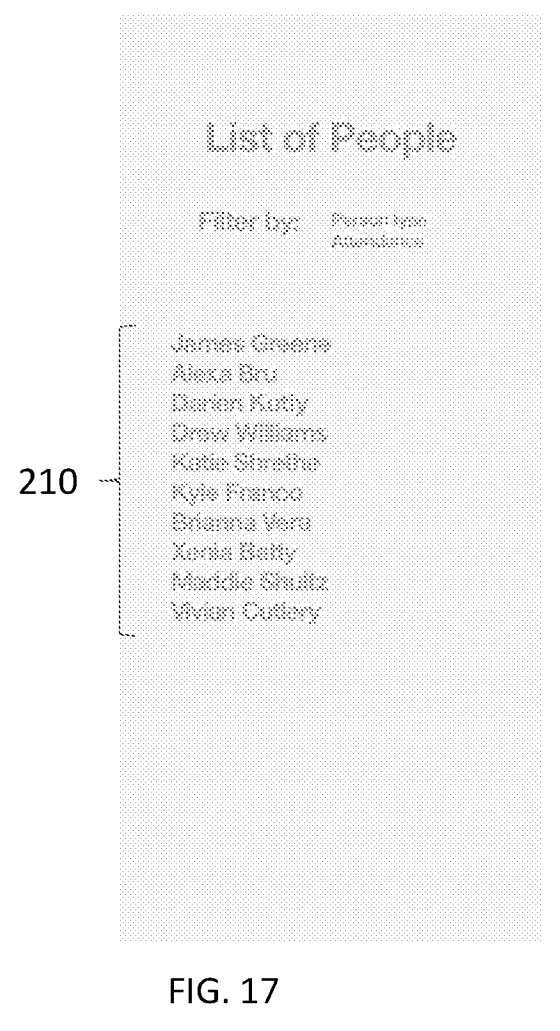

Administrators and teachers (and, optionally, other staff members and visitors) will be able to generate an accurate report of all personnel on site, or within a predetermined radius of the site, at the time of an emergency event. FIG. 17 shows an exemplary GUI that generates a list 210 of the lists names of people who are on site or within a predetermined radius of the site.

A site commander (administrator or emergency personnel) can channel all staff and student communications to a lower priority communications system, allowing him to focus only on communications from inside the building. Once a student sends notification of being outside the building and geofencing confirms that position, the server transmitting all communications will divert the device associated with that student to the lower priority system.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of operating an electronic communication system including a hand-held electronic device, the method comprising the steps of:
   (a) electronically generating a pass on the electronic device to permit user to travel within a facility;
   (b) electronically tracking the location of the user on the electronic device within the facility;
   (c) electronically generating a notification on the electronic device of an event;
   (d) electronically receiving a message on the electronic device from the user whether the user is inside or outside of the facility; and
   (e) electronically generating a list of people inside the facility on the electronic device;
   further comprising the step of:
   (f) electronically receive a message on the electronic device from the user indicating that the user has entered a geofenced reunification site;
   wherein, at the reunification site, step (f) further comprises the step of scanning a third party mobile electronic device at the reunification site to obtain a unique identifier from the third party mobile electronic device, the unique identifier being associated with the electronic device of the user.

2. The method according to claim 1, wherein step (a) comprises electronically providing an expiration time for the pass.

3. The method according to claim 1, wherein step (a) comprises electronically generating the pass for the present time or for a future time.

4. The method according to claim 1, wherein step (a) comprises electronically generating a list of locations within the facility.

5. The method according to claim 1, wherein step (a) comprises generating the pass by a third party for the user.

6. The method according to claim 5, wherein step (a) further comprises generating a list of electronically generated passes associated with both the user and the third party.

7. The method according to claim 1, wherein step (b) comprises generating the location of the user on an electronic map.

8. The method according to claim 1, wherein step (a) further comprises electronically storing prior passes.

9. The method according to claim 1, wherein step (b) further comprises tracking the location of the user for a predetermined radius outside of the facility.

10. The method according to claim 9, further comprising:
    (f) generating a list of users outside of the predetermined radius.

11. The method according to claim 1, wherein step (d) further comprises generating a status message to a contact list for the user.

12. The method according to claim 1, wherein step (d) further comprises generating a message regarding the location of the user to a third party.

13. The method according to claim 1, further comprising the step of electronically generating a report of a threat of violence.

14. The method according to claim 13, further comprising transmitting the report to a third party.

15. The method according to claim 1, further comprising:
    (f) electronically generating a list of users having passes.

16. The method according to claim 1, further comprising:
    (f) electronically generating an alert to the user.

17. The method according to claim 1, further comprising:
    (g) receiving an electronic message from the user.

* * * * *